(No Model.)
J. J. METZLER.
PROCESS OF AND APPARATUS FOR BREWING BEER.
No. 276,617. Patented May 1, 1883.
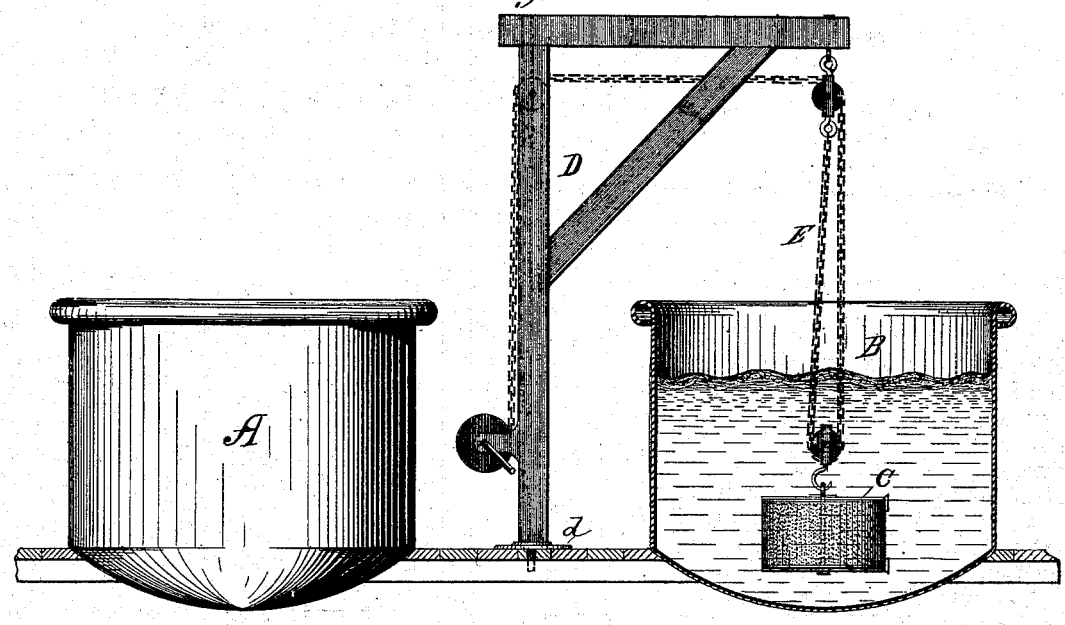
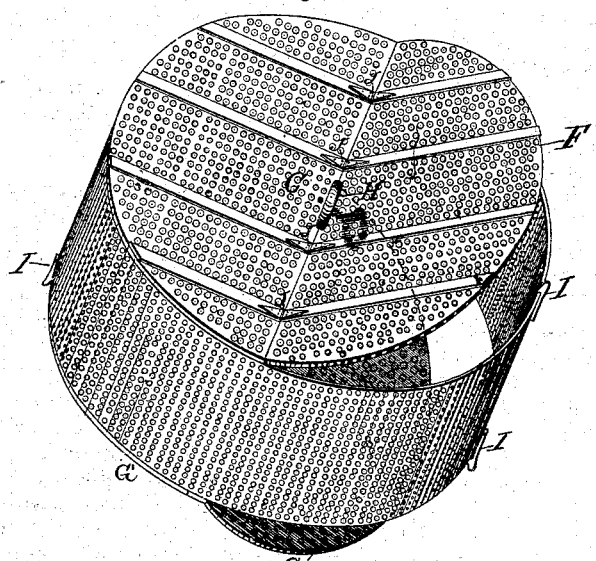

UNITED STATES PATENT OFFICE.

JOHANN J. METZLER, OF MILWAUKEE, WISCONSIN.

PROCESS OF AND APPARATUS FOR BREWING BEER.

SPECIFICATION forming part of Letters Patent No. 276,617, dated May 1, 1883.

Application filed November 22, 1882. (No model.)

*To all whom it may concern:*

Be it known that I, JOHANN JACOB METZLER, a citizen of the United States, residing at Milwaukee, in the county of Milwaukee, and in the State of Wisconsin, have invented certain new and useful Improvements in Processes of and Apparatus for Brewing Beer; and I do hereby declare that the following is a full, clear, and exact description thereof.

My invention relates to improvements in the art of brewing beer, and to certain mechanism by which I accomplish my end.

Heretofore in brewing beer it has been customary to scatter the hops loosely in the wort-kettle and to boil them until all of the essential oil and flavor of the hops has been extracted. This process is wasteful and inefficacious. The hops, by reason of their lighter specific gravity, float upon the surface of the wort, and much of the oil is distilled away into the air and escapes. This loss amounts to at least one-third of the whole oil contained by the hops.

The objects of my invention are to prevent the waste of the oil of hops by distillation so far as possible, thereby enabling a greater amount of beer to be brewed with the same quantity of hops heretofore used; to impart to the beer brewed a stronger flavor of the hops; and, finally, to simplify and cheapen the art of brewing. I attain these objects by means of the apparatus illustrated in the accompanying drawings, in which—

Figure 1 is an elevation, partly in section, of the ordinary brewing-kettles, together with my improvement; and Fig. 2 is a perspective view of the "basket" forming part of my invention, showing the top and one of the bottom lids open.

Similar letters refer to similar parts in both figures.

A B are the copper "kettles" employed in large breweries, where it is customary to brew several "suds" of beer per day.

C is a large basket, of perforated metal, preferably copper, suitably re-enforced by a rigid frame-work, as shown, and suspended by chains E from a swinging crane, D, in such manner that it can at will be raised from or lowered into either of the kettles A B. Crane D is an ordinary swinging crane with a pivotal support, $d$, to permit its revolution about the pivot as an axis. The rotary movement may be effected by any ordinary means or mechanism, such appliance forming no part of my invention. This basket is perforated on all sides, as shown, to permit the free circulation of wort without permitting the escape of the hops. It has lids F, G, and G', hinged at J J, and normally held in place by spring-catches I I I, or by equivalent means. H is a bolt passing completely through the basket to give it greater rigidity, and terminating, as shown, in a ring or hook, by which the basket may be suspended from chains E.

It is obvious that many changes could be made in the form, material, or subordinate details of this apparatus without departing from the spirit of my invention; but I prefer the appliances as described above.

In practicing my invention I usually place one-third of the whole amount of hops to be employed in brewing one sud (for example, one hundred pounds) loose in the kettle, in the ordinary manner, and boil them from one to one and one-half hour, as may be expedient under varying conditions. ("Sud" is a technical word employed by brewers to designate the supply of wort or malt liquor used for the brewing of one lot or quantity of beer.) I then place the remainder of the hops—say two hundred pounds—in the basket by raising the top lid, F, which is then closed and fastened. The basket is then lowered into the wort until it reaches substantially the position shown in Fig. 1. The boiling is now continued for about as long a time as before. At the expiration of this time, or when the whole sud has been boiled from two to three hours, the basket is drawn up from the wort and swung over by means of the crane to a position immediately above the second kettle. The lids G G' are now released from detention by the catches I, and the partially-spent hops are suffered to fall into the second kettle, which has in the meantime been prepared for their reception. It will be readily understood that the hops, owing to their confinement in the basket and preservation from the air, have parted with a much smaller percentage of their flavor than would be the case if the hops were allowed to float loosely upon the wort, as in the ordinary method, with large portions of their surfaces wholly out of the liquid. The saving amounts in practice to about fifty per cent. The hops that were emptied into the second kettle will therefore contain as much oil as the one hundred pounds placed at the start in the first kettle, and may, in fact, correspond to the hops first used in brewing a fresh sud in the second kettle. When these half-spent hops have been boiled a sufficient time in the second kettle to extract the remainder of their oil, the basket is again supplied with hops, as before, and lowered into the second kettle. At the proper time it is once more raised and swung over the first kettle, which has been prepared afresh for their reception. The bottom lids are again opened, the hops suffered to fall into the wort, as before, and the boiling recommenced in the first kettle. The process may thus be continued indefinitely, with the addition of only two hundred pounds of fresh hops for each sud, instead of the three hundred pounds used for the first sud, and which would in the ordinary process of brewing be wholly destroyed. The theoretical saving in hops in every sud will therefore amount to at least thirty-three and one-third per centum of the amount employed in former processes. In practice this saving is frequently exceeded and is of great pecuniary importance. The beer brewed is of better quality, finer flavor, and holds in body a much larger proportion of the essence of the hops.

Although I have described my invention in connection with two kettles, it is evident that it may be applied to a single kettle with proportionate results. The hops being preserved from contact with the air, their strength would be entirely absorbed by the wort rather than distilled away into the air, so that the same amount of hops would be sufficient to form a much larger quantity of beer than is ordinarily obtained.

The duration in time of this process may be varied, the entire boiling of the hops may take place in the basket, the basket may have two lids on its upper as well as its lower side, and may have suitable appliances for raising or lowering the lids. It is thus seen that the aromatic principles derived from the fresh hops are not dissipated in the air during the prolonged boiling of the wort, but are retained within the liquor, insuring better and more highly-flavored beer at a material reduction in cost, and where two kettles are employed making the brewing of successive suds dependent each upon the other, so that the whole may become one continuous process, rather than a series of disjointed acts.

I claim as my invention—

1. That improvement in the process of brewing beer which consists in first boiling a small portion of the hops in the open kettle, then boiling a larger portion of hops in a basket or equivalent appliance submerged in the kettle, as described.

2. That improvement in the process of brewing beer which consists in first boiling a small portion of hops in an open kettle, then boiling a larger portion of hops in a basket or equivalent appliance submerged in the kettle until a part of their strength has been exhausted, and finally transferring the partially-spent hops from the basket to a second kettle, where they will float loosely upon the wort until the remainder of their strength is exhausted, so that the brewing of successive suds of beer with two kettles may be made the interdependent and coactive steps of one continuous process, all as described.

3. The combination of kettles A B, basket C, and swinging or pivoted crane D, having chains or equivalent supports E.

In testimony that I claim the foregoing I have hereunto set my hand, on this 16th day of November, 1882, in the presence of two witnesses.

JOHANN JACOB METZLER.

Witnesses:
C. W. HENNING,
HENRY L. SMITH.